April 19, 1966  W. A. SHURCLIFF  3,247,379
RADIATION DOSIMETER
Filed Oct. 21, 1952

INVENTOR
William A. Shurcliff

BY Brown and Mikulka
and
Gerald Altman
ATTORNEYS

United States Patent Office 3,247,379
Patented Apr. 19, 1966

3,247,379
RADIATION DOSIMETER
William A. Shurcliff, Cambridge, Mass., assignor to Polaroid Corporation, Cambridge, Mass., a corporation of Delaware
Filed Oct. 21, 1952, Ser. No. 315,966
13 Claims. (Cl. 250—83)

This invention relates to detection and more particularly to means, commonly known as dosimeters, for detecting and measuring penetrative radiation of the kind emanating from radioactive or fissionable materials.

Certain materials are known to undergo an appreciable change in physical and/or chemical properties, herein termed a response, when subjected to penetrative radiation, e.g., gamma radiation in the photon energy range of from 0.1 to 5.0 mev., of the kind emanating from radioactive or fissionable materials. It is apparent that such a material or combination of materials may be fashioned into a detecting element which, when affixed to a wearer, is adapted to give a rough indication of the quantity of penetrative radiation, or the dose, to which the wearer has been subjected, the dose ordinarily being measured in roentgens.

A detecting element of the aforementioned type will indicate the dose to which it itself has been subjected and, when mounted adjacent a region of a wearer's body, will indicate approximately the dose to which that region has been subjected. In determining the harmful effects of penetrative radiation on the wearer's body as a whole, however, the doses received by the various regions of the wearer's body must be taken into consideration. By way of example, the average of the doses of penetrative radiation received by various regions of the wearer's body is of real medical significance.

It has been found that there may be a tremendous difference between the dose recorded by a detecting element of the aforementioned type and the average of the doses received by the various regions of the wearer's body. Consider, for example, a person who wears such a detecting element on his chest in the presence of an atomic explosion. The average dose of gamma radiation from the explosion received by the wearer, and the attendant harmful effects associated with this average, will be of the same order of magnitude irrespectively of whether the wearer has faced toward or away from the explosion. Yet, the detecting element on his chest will indicate a smaller than average dose when the wearer has faced away from the explosion and a larger than average dose when the wearer has faced toward the explosion. The smaller dose is indicated by reason of the shielding effect of the wearer's body, the larger dose by reason of an absence of shielding. Similar discrepancies between the dose indicated by a detecting element of the above type and the average dose received by the wearer's body exist when radiation strikes the wearer's body from the side, from overhead, or from underfoot.

The present invention contemplates the provision of a dosimeter comprising a detecting element and at least two modifying elements, at least one of which, when the dosimeter is affixed to a wearer, is capable of controlling the aggregate effect on the detecting element of a given dose incident upon the wearer and the dosimeter in such a manner as to produce in the detecting element a given response irrespectively of the direction with respect to the wearer and the dosimeter from which the dose emanates.

This aggregate effect is the sum of the primary and secondary effects on the detecting element of the dose. The primary effect is caused by that fraction of the dose which passes unchanged through the media surrounding the detecting element. The secondary effect is caused primarily by that fraction of the dose which is absorbed by the media surrounding the detecting element and which causes so-called forward scattering of secondary electrons toward the detecting element. The response of the detecting element to a given dose is a function of the energy which it absorbs by virtue of the aggregate effect of that dose. The approximate factor by which a modifying element increases or decreases the energy absorbed by a detecting element from such a dose is herein termed the modification coefficient of the modifying element for that detecting element and is designated by M. A modifying element which increases the energy so absorbed by a detecting element has a modification coefficient for that detecting element of greater than one. A modifying element which decreases the energy so absorbed by a detecting element has a modification coefficient for that detecting element of less than one but, of course, greater than zero. A modifying element which does not increase or decrease the energy so absorbed by a detecting element has a modification coefficient for that detecting element of one. Hereinafter, when the term "modification coefficient" serves to characterize a modifying element, it will be assumed, unless otherwise specified, that the term has reference to the detecting element with which the modifying element is associated.

Ordinarily, a modifying element composed of a material of relatively low atomic number, that is, of an atomic number less than fifteen, has a modification coefficient of at least one. A reasonable thickness of such a modifying element, that is, a thickness of a few millimeters or, more exactly, a thickness corresponding to an area concentration of a few tenths of a gram per square centimeter, absorbs only a small fraction of an incident dose and emits a relatively large number of forward-scattered secondary electrons. Since only a small fraction of the dose is absorbed by such a modifying element, the primary effect of the dose on the detecting element is approximately what it would be if it were to strike the detecting element directly. The small fraction of the dose absorbed causes the modifying element to emit a relatively large number of forward-scattered secondary electrons which can appreciably affect a thin detecting element but which, because they cannot penetrate deeply into a thick detecting element, cannot appreciably affect it. Thus, a modifying element composed of a material of relatively low atomic number has a modification coefficient for a thin detecting element of greater than one and a modification coefficient for a thick detecting element of approximately one.

Ordinarily, a modifying element composed of a material of relatively high atomic number, that is, of an atomic number greater than thirty, has a modification coefficient of at most one. A reasonable thickness of such a modifying element, that is, a thickness of the order of a centimeter or, more exactly, a thickness corresponding to an area concentration of the order of ten grams per square centimeter, absorbs a relatively large fraction of an incident dose and emits a relatively insignificant number of secondary electrons. Such a modifying element, when relatively thick, because it is capable of absorbing a large fraction of the dose, has a modification coefficient of less than one. Such a modifying element, when relatively thin, because it absorbs only a small fraction of the dose and emits a relatively insignificant number of secondary electrons, has a modification coefficient of one. Such a modifying element, however, when thin, is capable of shielding the detecting element from secondary electrons emanating from the media surrounding it.

The foregoing principles are employed in a dosimeter embodying the present invention in the following manner.

A first modifying element and a second modifying element are located generally on opposite sides of a detecting element. In operation, the dosimeter is so affixed to a wearer that the first modifying element is adjacent to and the second modifying element is remote from the wearer. In order that a given dose incident upon the wearer and the dosimeter produce in the detecting element a given response irrespectively of the direction from which the dose emanates, the modification coefficient of the wearer's body itself is related to the modification coefficients of the first and second modifying elements as follows:

(M body) × (M first modifying element)
 = (M second modifying element)

Since it has been determined that for gamma radiation emanating from an atomic bomb burst the modification coefficient of the human body is within the range of .3 to .8, we have:

$$\frac{(M \text{ second modifying element})}{(M \text{ first modifying element})} = \text{a constant within the range of .3 to .8}$$

That fraction of a dose absorbed by any of the modifying elements referred to above causes so-called backward scattering of secondary electrons which, when directed toward a detecting element, produce a response which ordinarily can be ignored but which, if desired, can be considered.

Accordingly, objects of the present invention are: to provide a dosimeter for determining the effective dose of penetrative radiation received by a wearer, the dosimeter comprising a detecting element composed of a material which, when subjected to a dose of penetrative radiation, provides a response by reason of the aggregate effect of the dose, the response being functionally related to the magnitude of the dose, a first modifying element an area of the surface of which is contiguous with one area of the surface of the detecting element, and a second modifying element an area of the surface of which is contiguous with substantially all of the remaining areas of the surface of the detecting element, the first modifying element having a modification coefficient of at least one, the second modifying element having a modification coefficient of at most one; to provide a dosimeter of the above type wherein the first modifying element is composed of a material having an atomic number of at most fifteen and the second modifying element is composed of a material having an atomic number of at least thirty; to provide a dosimeter of the above type wherein the quotient of the modification coefficient of the second modifying element divided by the modification coefficient of the first modifying element is a constant within the range of .3 to .8; and to provide a dosimeter of the above type wherein the detecting element has two parallel faces, the first modifying element being contiguous with one of the faces and the second modifying element being contiguous with the other of the faces.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
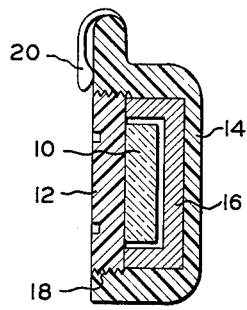
FIGURE 1 is a cross-sectional view of a dosimeter embodying the present invention with the components thereof operatively assembled.
Figure 2:
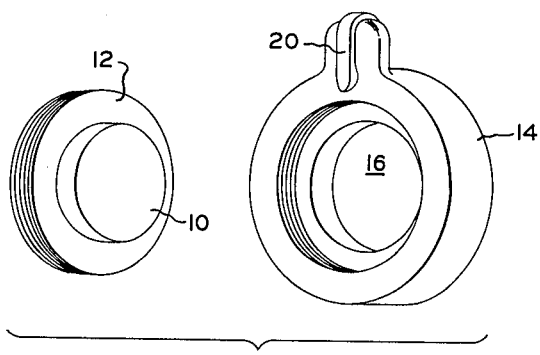
FIG. 2 is an exploded perspective view of the dosimeter of FIG. 1.

With reference now to the drawing, FIGS. 1 and 2 illustrate a dosimeter which, in accordance with the present invention, comprises a detecting element 10 for measuring the effective dose of penetrative radiation to which the body of a wearer has been subjected. As shown, detecting element 10 is in the form of a silver phosphate glass disk having two flat, parallel faces and a circular periphery. It has been found that after silver phosphate glass has received a dose of gamma radiation, it has the property of emitting orange fluorescent light upon being subjected to near-ultraviolet radiation. The intensity of such fluorescent light is substantially proportional to the magnitude of the dose and may be measured by a suitable photometer. Silver phosphate glass detecting elements of the foregoing type are more fully described by J. H. Schulman, R. J. Ginther, C. C. Klick, R. S. Alger and R. A. Levey in the Journal of Applied Physics, vol. 22, No. 12, pp. 1479–1487, December 1951.

As a means for mounting and enclosing detecting element 10, a casing, which includes a mounting means or base 12 and a closure means or cover 14, is provided. Base 12 and cover 14 are composed of a material of relatively low atomic number, preferably of at most fifteen, for example an organic plastic such as Lucite, polystyrene or Bakelite or a light metal such as aluminum or magnesium. Base 12, to which detecting element 10 is affixed, is in the form of a peripherally threaded disk. Cover 14 provides a cavity within which is seated a cup-shaped, modifying element 16 composed of a material of relatively high atomic number, preferably of at least thirty, for example cadmium, lead or uranium. Cover 14, which is internally threaded, is adapted to receive the periphery of base 12 at 18. Such means as a clip 20 is provided for fastening the dosimeter to the wearer in such a manner that base 12 is adjacent to and modifying element 16 is remote from the wearer.

When base 12 is threaded into cover 14, detecting element 10 is so located within the housing that one of its faces is contiguous with an area of the surface of base 12 and the other of its faces and its periphery are contiguous with an area of the surface of modifying element 16. Here, since detecting element 10 is relatively thick, it is not affected appreciably by secondary electrons emitted by base 12 which, accordingly, has a modification coefficient of one. Therefore, in order that the response of detecting element 10 to a given dose be the same no matter from which direction the dose emanates, modifying element 16 is so constituted that its modification coefficient is equal to the modification coefficient of the human body or to a constant within the range of .3 to .8.

In operation, the assembled dosimeter is secured to a wearer, for example to his breast pocket, with the free end of clip 20 pointing downwardly so that modifying element 12 is adjacent to and modifying element 16 is remote from the wearer. In this position, a dose of given magnitude directed through the wearer toward detecting element 10 and a dose of the given magnitude directed through modifying element 16 toward the detecting element will produce in the detecting element the same response. In order to measure the amount of penetrative radiation to which the wearer has been subjected, base 12 is unthreaded from cover 14. The exposed face of detecting element 10 may now be excited with near-ultraviolet radiation and the intensity of fluorescent light emanating from the periphery of detecting element 10 measured by such means as a suitable photometer.

Figure 3:
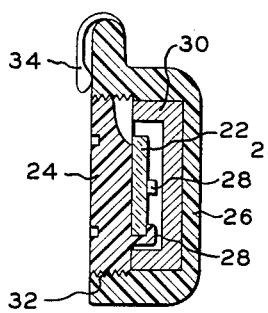
FIG. 3 is a cross-sectional view of an alternative dosimeter embodying the present invention with the components thereof operatively assembled.
Figure 4:
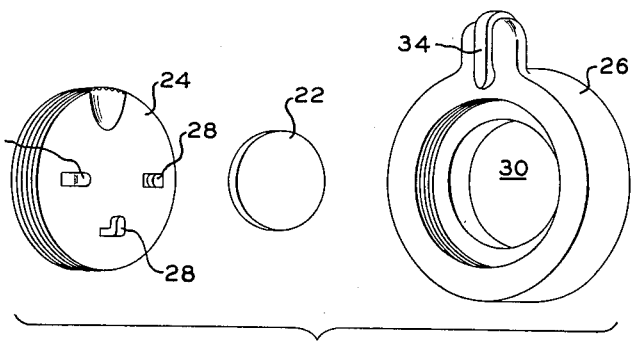
FIG. 4 is an exploded perspective view of the dosimeter of FIG. 3.

Referring now to FIGS. 3 and 4, there is shown an alternative embodiment of a dosimeter which, in accordance with the present invention, comprises a detecting element 22 for measuring the effective dose of penetrative radiation to which a wearer has been subjected. As shown, detecting element 22 is in the form of a photosensitive sheet having a circular periphery and two flat, parallel faces on one of which is coated a photosensitive silver halide emulsion. The aggregate effect of incident gamma radiation is to produce in the silver halide emulsion latent fog developable to visible fog the intensity of which may be measured by a suitable comparison scale or photometer.

As a means for mounting and enclosing detecting element 22, a casing, which includes a mounting means or base 24 and a closure means or cover 26, is provided. Base 24 and cover 26 are composed of a material of relatively low atomic number, preferably of at most fifteen, such as an organic plastic which does not appreciably attenuate gamma radiation. Base 24, to which detecting element 22 may be affixed by means of a plurality of fingers 28, is in the form of a peripherally threaded disk. Preferably, detecting element 22 is so affixed to base 24 that its emulsion coating is adjacent to modifying element 30. Cover 26 provides a cavity within which is seated a cup-shaped modifying element 30 composed of a material of relatively high atomic number, preferably of at least thirty. Cover 26, which is internally threaded, is adapted to receive the periphery of base 24 at 32. Such means as a clip 34 is provided for fastening the dosimeter to a wearer in such a manner that base 24 is adjacent to and modifying element 30 is remote from the wearer.

When base 24 is threaded into cover 26, detecting element 22 is so located within the housing that one of its faces is contiguous with an area of the surface of base 24 and the other of its faces and its periphery are contiguous with an area of the surface of modifying element 30. Here, since detecting element 22 is relatively thin, it is appreciably affected by secondary electrons scattered from base 24. In order that the response of detecting element 22 to a given dose be the same no matter from which direction the dose emanates, base 24 and modifying element 30 are so constituted that the quotient of the modification coefficient of the modifying element divided by the modification coefficient of the base is equal to a constant within the range of .3 to .8. It is to be noted that if the modification coefficient of modifying element 30 is one, the modification coefficient of base 24 is the reciprocal of the modification coefficient of the wearer's body.

The operation of the dosimeter of FIGS. 3 and 4 is similar to that of the dosimeter of FIGS. 1 and 2. In order to measure the amount of penetrative radiation to which the wearer has been subjected, base 24 is unthreaded from cover 26. Detecting element 22 is then developed and the intensity of its resulting visible fog is measured by means of a densitometer or comparison scale.

In practice, the response which the detecting element provides will be dependent upon the energy of the penetrative radiation to which it has been subjected. As a means for eliminating such energy dependence, appropriate portions of the dosimeter may be encased in shields composed of a material of relatively high atomic number as is conventional in dosimeter design.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, and a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element having a modification coefficient for said detecting element of at least one, said second modifying element having a modification coefficient for said detecting element of at most one, and means for affixing said dosimeter to said wearer so that said first modifying element is adjacent to said wearer and said second modifying element is remote from said wearer.

2. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, and a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element being composed of a material having an atomic number of at most fifteen, said second modifying element being composed of a material having an atomic number of at least thirty, and means for affixing said dosimeter to said wearer so that said first modifying element is adjacent to said wearer and said second modifying element is remote from said wearer.

3. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, and a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element being composed of a material having an atomic number of at most fifteen and a modification coefficient for said detecting element of at least one, and having a thickness corresponding to an area concentration of a few tenths of a gram per square centimeter, said second modifying element being composed of a material having an atomic number of at least thirty and a modification coefficient for said detecting element of at most one and having a thickness corresponding to an area concentration of the order of 10 grams per square centimeter, and means for affixing said dosimeter to said wearer so that said first modifying element is adjacent to said wearer and said second modifying element is remote from said wearer.

4. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element having a modification coefficient for said detecting element of at least one, said second modifying element having a modification coefficient for said detecting element of at most one, said first modifying element being composed of a material having an atomic number of at most fifteen, said second modifying element being composed of a material having an atomic number of at least thirty, and means for affixing said dosimeter to said wearer so that said first modifying element is adjacent to said wearer and said second modifying element is remote from said wearer.

5. A dosimeter for determining the effective dose of penetrative radiation received by a wearer, said dosimeter comprising a detecting element which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, and a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element having a modification coefficient for said detecting element of at least one, said second modifying element having a modification coefficient for said detecting element of at most one, said first modifying element being composed of a plastic material having an atomic number of at most fifteen, said second modifying element being composed of a metallic material having an atomic number of at least thirty, said detecting element being composed of silver phosphate glass, and means for affixing said dosimeter to said wearer so that said first modifying element is adjacent to said wearer and said second modifying element is remote from said wearer.

6. A dosimeter for determining the effective dose of penetrative radiation received by a wearer, said dosimeter comprising a detecting element which, when subjected to a dose of penetrative radiation, provides a response by reason of the aggregate effect of said dose, said response being functionally related to the magnitude of said dose, a first modifying element an area of the surface of which is contiguous with one area of the surface of said detecting element, and a second modifying element an area of the surface of which is contiguous with substantially all of the remaining areas of the surface of said detecting element, whereby the arrangement of the elements of said dosimeter is such that the medial portions of said first modifying element, said detecting element and said second modifying element are in immediate sequence, said first modifying element having a modification coefficient for said detecting element of at least one, said second modifying element having a modification coefficient for said detecting element of at most one, said first modifying element being composed of a material having an atomic number of at most fifteen, said second modifying element being composed of a material having an atomic number of at least thirty, said detecting element including a silver halide emulsion, and means for affixing said dosimeter to said wearer so that said first modifying element is adjacent to said wearer and said second modifying element is remote from said wearer.

7. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, said detecting element having a pair of substantially parallel faces and a periphery, a first modifying element an area of the surface of which is contiguous with one face of said pair, and a second modifying element an area of the surface of which is contiguous with the other face of said pair and said periphery, whereby the arrangement of the elements of said dosimeter is such that the medial portions of said first modifying element, said detecting element and said second modifying element are in immediate sequence, said first modifying element being composed of a material having an atomic number of at most fifteen, said second modifying element being composed of a material having an atomic number of at least thirty, and means for affixing said dosimeter to said wearer so that said first modifying element is adjacent to said wearer and said second modifying element is remote from said wearer.

8. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, said detecting element having a pair of substantially parallel faces and a periphery, a first modifying element an area of the surface of which is contiguous with one face of said pair, and a second modifying element an area of the surface of which is contiguous with the other face of said pair and said periphery, whereby the arrangement of the elements of said dosimeter is such that the medial portions of said first modifying element, said detecting element and said second modifying element are in immediate sequence, said first modifying element being composed of a material having an atomic number of at most fifteen and a modification coefficient of at least one, said second modifying element being composed of a material having an atomic number of at least thirty and a modification coefficient of at most one, and means for affixing said dosimeter to said wearer so that said first modifying element is adjacent to said wearer and said second modifying element is remote from said wearer.

9. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, said detecting element having a pair of substantially parallel faces and a periphery, a first modifying element an area of the surface of which is contiguous with one face of said pair, and a second modifying element an area of the surface of which is contiguous with the other face of said pair and said periphery, whereby the arrangement of the elements of said dosimeter is such that the medial portions of said first modifying element, said detecting element and said second modifying element are in immediate sequence, said first modifying element being composed of a material having an atomic number of at most fifteen and a modification coefficient of at least one and having a thickness corresponding to an area concentration of a few tenths of a gram per square centimeter, said second modifying element being composed of a material having an atomic number of at least thirty and a modification coefficient of at most one and having a thickness corresponding to an area concentration of the order of 10 grams per square centimeter, said first and second modifying elements being so related that the quotient of the modification coefficient for said detecting element of said first modifying element divided by the modification coefficient for said detecting element of said second modifying element is equal to the modification coefficient of said wearer, and means for affixing said dosimeter to said wearer so that said first modifying element is adjacent to said wearer and said second modifying element is remote from said wearer.

10. A dosimeter for determining the effective dose of penetrative radiation received by a wearer, said dosimeter comprising a detecting element composed of a material which, when subjected to a dose of penetrative radiation, provides a response by reason of the aggregate effect of said dose, said response being functionally related to the magnitude of said dose, said detecting element having a pair of substantially parallel faces and a periphery, a first modifying element an area of the surface of which is contiguous with one face of said pair, and a second modifying element an area of the surface of which is contiguous with the other face of said pair and said periphery, said first modifying element being composed of a material having an atomic number of at most fifteen and a modification coefficient of at least one, said second modifying element being composed of a material having an atomic number of at least thirty and a modification coefficient of at most one, said first and second modifying elements being so related that the quotient of the modification coefficient for said detecting element of the first modifying element divided by the modication coefficient for said detecting element of said second modifying element is a constant within the range of .3 to .8, and means for affixing said dosimeter to said wearer so that said first modifying element is adjacent to said wearer and said second modifying element is remote from said wearer.

11. A dosimeter for determining the effective dose of penetrative radiation received by a wearer, said dosimeter comprising a base, a cover capable of being secured to said base to form therewith a casing, a detecting element which, when subjected to a dose of penetrative radiation, provides a response by reason of the aggregate effect of said dose, said response being functionally related to the magnitude of said dose, said cover defining a cavity for said detecting element, said detecting element being mounted on said base so that a surface of said base is contiguous with one area of the surface of said detecting element, said base including a shield which lines said cavity so that a surface of said shield is contiguous with substantially all the remaining areas of the surfaces of said detecting element, said base being composed of a material having an atomic number of at most 15, said shield being composed of a material having an atomic number of at least 30, and means for affixing said dosimeter to said wearer so that said base is adjacent to said wearer.

12. The dosimeter of claim 11 wherein said base has a thickness corresponding to an area concentration of a few tenths of a gram per square centimeter and said shield has a thickness corresponding to an area concentration of the order of 10 grams per square centimeter.

13. The dosimeter of claim 12 wherein said base is composed of a plastic material and said shield is composed of a metallic material.

References Cited by the Examiner
UNITED STATES PATENTS

| | | | |
|---|---|---|---|
| 2,459,528 | 1/1949 | Hook | 250—65 |
| 2,469,461 | 5/1949 | Russell | 250—83 |
| 2,496,218 | 1/1950 | Kieffer | 250—83 |
| 2,524,839 | 10/1950 | Schulman et al. | 250—71 X |
| 2,624,846 | 1/1953 | Tochilin et al. | 250—83 |

RALPH G. NILSON, *Primary Examiner.*